March 6, 1962     W. B. HOWSMON, JR     3,024,267
PREPARATION OF HYDRACRYLONITRILE
Filed Sept. 3, 1959
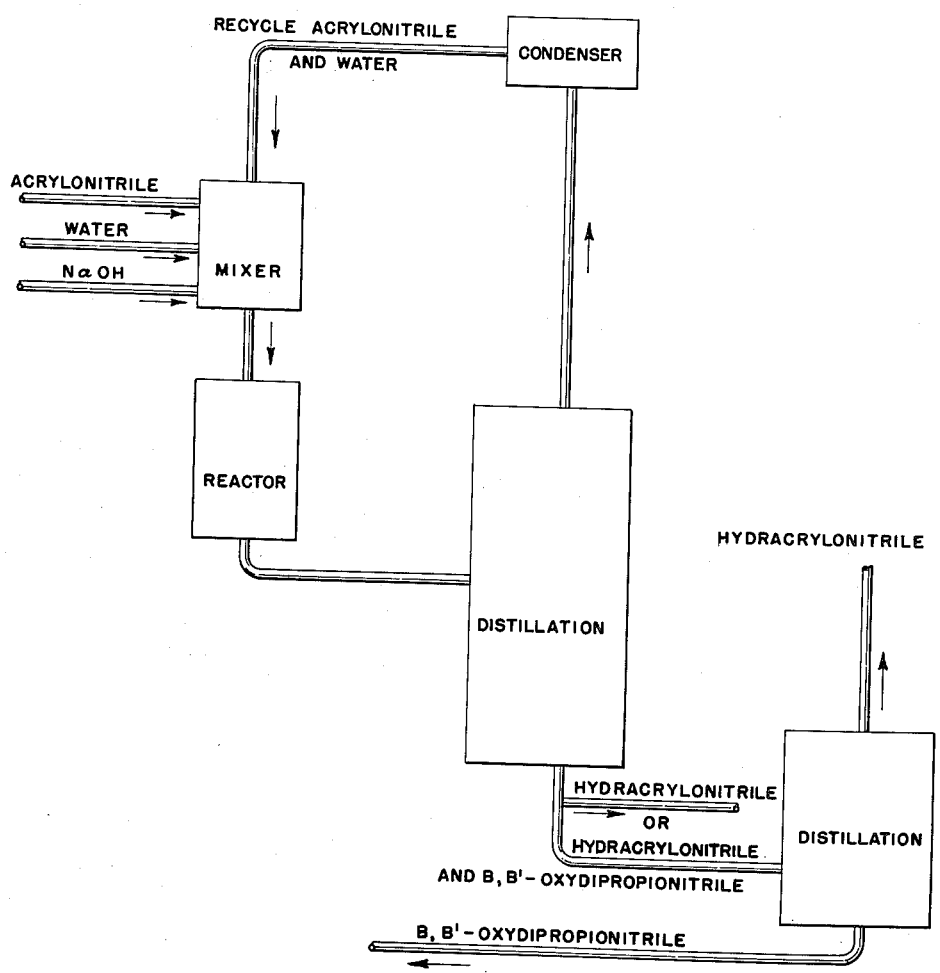
INVENTOR.
WILFRED B. HOWSMON, JR.
BY
his ATTORNEY

3,024,267
PREPARATION OF HYDRACRYLONITRILE
Wilfred B. Howsmon, Jr., Aurora, Ohio, assignor to The Standard Oil Company, Cleveland, Ohio, a corporation of Ohio
Filed Sept. 3, 1959, Ser. No. 837,803
1 Claim. (Cl. 260—465.6)

This invention relates to a continuous process for making hydracrylonitrile from acrylonitrile and water.

Hydracrylonitrile has the formula HO—CH$_2$CH$_2$—CN. It is also known as ethylene cyanohydrin but will be referred to hereinafter as hydracrylonitrile. It can be formed (on a theoretical basis) by the reaction of one mole of acrylonitrile with one mole of water according to the following equation:

$$CH_2=CH-CN+H_2O \rightarrow HO-CH_2CH_2-CN$$

According to Patent No. 2,382,036, which relates to a method of making bis(2-cyanoethyl)ether, also known as β,β'-oxydipropionitrile, by the theoretical combination of two moles of acrylonitrile with one mole of water, it is stated that the water "apparently" reacts with acrylonitrile to form the hydracrylonitrile as an intermediate which then, in turn, condenses with more acrylonitrile to form the bis-(2-cyanoethyl)ether. There is no disclosure of the separation of the hydracrylonitrile as a product of the reaction.

Hydracrylonitrile is a valuable chemical compound with many uses and in particular, is readily converted by hydrogenation to 3-amino-1-propanol.

I have discovered in accordance with my invention that hydracrylonitrile may be obtained in good yields as the final product by reacting acrylonitrile with water in the presence of a relatively large excess of water at an elevated temperature, but nevertheless in the liquid phase, in the presence of a small amount (0.1 to 2 weight percent) of an alkali metal hydroxide, based on the water-acrylonitrile mixture.

The invention will be understood in connection with the following detailed description in connection with the drawings which form a part hereof and which constitute a flow sheet:

Referring more particularly to the flow sheet, a recycle acrylonitrile and water mixture is fed into a mixer where makeup acrylonitrile, makeup water and a small amount of aqueous sodium hydroxide are added and thoroughly mixed. The mixture is then fed into a reactor which is maintained at an elevated temperature as described hereinafter. The reaction takes place in a relatively short time and the effluent of the reactor is then fed to a distillation column. Unreacted acrylonitrile and water pass overhead as an azeotrope, together with excess water, and are condensed and are returned as recycle to the mixer. From the bottom of the column the hydracrylonitrile is taken as a final product. If the reaction conditions are such that only hydracrylonitrile is formed, the crude reaction product may be removed at the bottom of the column. If the reaction conditions are such that β,β'-oxydipropionitrile is also formed, or if the purity of the hydracrylonitrile wanted is very high, the effluent from the bottom of the distillation column may be fed to a second distillation column, preferably under vacuum where the hydracrylonitrile is distilled over and the bottoms comprise the β,β'-oxydipropionitrile and caustic.

The ratio of the acrylonitrile to water is important and the amount of the acrylonitrile should not be in excess of that which will dissolve in the water at the temperature of the reaction. The following table is indicative of the solubility of acrylonitrile in water at various temperatures:

| Temperature, ° C.: | Volume percent acrylonitrile soluble in water |
|---|---|
| 60 | 9.4 |
| 80 | 13.3 |
| 90 | 15.6 |

Preferably, the aqueous solution comprises 1 to 10 volume percent acrylonitrile and within this range, the lower amounts give optimum results, namely 2½ to 5 volume percent.

The reaction takes place at an elevated temperature above 60° C., since temperatures below this seem to favor the formation of the β,β'-oxydipropionitrile. The upper temperature should not be more than that which will maintain the mixture in the liquid phase at the pressure employed, since the reaction is carried out in a homogeneous liquid phase. When operating at atmospheric pressures, the upper temperature should not exceed about 95° C., since this is near the boiling point of the acrylonitrile-water azeotrope. However, since it is possible to operate the entire system under pressure, the boiling point of the water-acrylonitrile azeotrope at the particular pressure involved will be the upper limit. Reference here and to carrying out the reaction in the liquid phase is intended automatically to set an upper temperature limit.

A small amount of an alkali metal hydroxide is employed as the catalyst. When employing sodium hydroxide the amount should be in the range of 0.1 to 2% by weight.

As showing the effect of the concentration of the acrylonitrile in water on the yield of the several products, the process was carried out at a temperature of 95° C. with an amount of sodium hydroxide to provide a pH of 13.5.

| Feed composition volume percent of acrylonitrile and water | Conversion to hydracrylonitrile | Conversion to β,β'-oxydipropionitrile | Selectivity for hydracrylonitrile | Selectivity for β,β'-oxydipropionitrile |
|---|---|---|---|---|
| 2.5 | 48 | 0 | 100 | 0 |
| 5.0 | 42 | 20 | 70 | 30 |
| 7.5 | 43 | 22 | 66 | 34 |

From the above table, it will be seen that when it is desired to produce only the hydracrylonitrile, fairly dilute solutions, i.e., of the order of 2.5% are preferred.

As showing the effects of temperature, the process was carried out at a temperature of 40° C. at a concentration of 5 vol. percent acrylonitrile and water with sodium hydroxide to provide a pH of 13.5. At 40° C., after three hours, only 80% of the acrylonitrile was reacted to form any product. At 95° C., the reflux temperature, the reaction is practically instantaneous.

As showing the effect of the product distribution, two runs as above described and otherwise identical except that they were carried out at 60° C. and 95° C. show the following selectivity for hydracrylonitrile and β,β'-oxydipropionitrile:

| Temperature | 60° C. | 95° C. |
|---|---|---|
| Selectivity for hydracrylonitrile, percent | 57 | 78 |
| Selectivity for β,β'-oxydipropionitrile, percent | 43 | 22 |

The preceding description of the invention is intended to be illustrative and undoubtedly there are many changes or modifications of the procedure outlined above which will occur to those skilled in the art. However, this application for Letters Patent is intended to cover all modifications of this invention which do not depart from the spirit and scope of the appended claim.

I claim:
A method for producing hydracrylonitrile substantially free of β,β'-oxydipropionitrile which comprises the steps of heating in the liquid phase an aqueous solution of acrylonitrile containing about 2.5% by volume of acrylonitrile to a temperature of about 95° C. in the presence of 0.1 to 2% by weight of an alkali metal hydroxide in a reaction zone and recovering hydracrylonitrile from the reaction zone effluent.

References Cited in the file of this patent
UNITED STATES PATENTS

| | | |
|---|---|---|
| 2,382,036 | Bruson | Aug. 14, 1945 |
| 2,404,164 | Carpenter | July 16, 1946 |
| 2,816,130 | Selcer et al. | Dec. 10, 1957 |